United States Patent Office 3,534,117
Patented Oct. 13, 1970

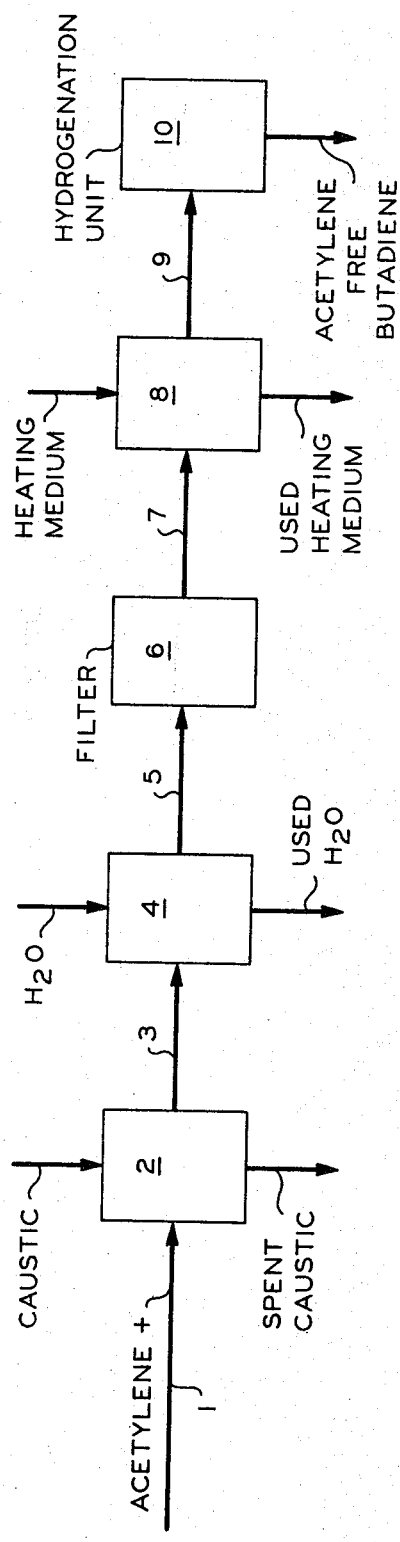

3,534,117
BUTADIENE PURIFICATION
William C. Clark, Sweeny, Tex., assignor to Phillips Petroleum Company, a corporation of Delaware
Filed Feb. 6, 1968, Ser. No. 703,343
Int. Cl. C07c *7/00;* C10g *19/00*
U.S. Cl. 260—681.5                            1 Claim

ABSTRACT OF THE DISCLOSURE

A charcoal filter is interposed between the usual caustic wash and the heat exchanger preceding the hydrogenation unit in which acetylene is hydrogenated in the butadiene thereby preventing deposition of polymers in the heat exchanger owing to presence of polymers formed due to the catalytic action of the caustic on carbonyls in the butadiene stream. The charcoal filter is preferably positioned following the usual water wash after the caustic wash which is employed to remove any entrained caustic and, to an extent, any remaining carbonyls.

---

This invention relates to the purification of butadiene. In one of its aspects it relates to the removal of acetylene contained in a stream of butadiene. In another of its aspects, the invention relates to the preparation of a stream containing butadiene and acetylenes for an ensuing hydrogenation to remove acetylenes therefrom.

In one of its concepts the invention provides a process for the hydrogenation of acetylenes in butadiene in which, after caustic washing the stream prior to the hydrogenation in the presence of a catalyst, there is provided a charcoal filter to remove carbonyl compounds which, upon heating, will form so-called "aldehyde-resins" when the stream is subjected to preheating before the acetylene's hydrogenation step. In another concept of the invention, it provides a series of steps comprising caustic washing an acetylene-containing butadiene stream, water washing the caustic treated stream to remove caustic carry-over, if any, subjecting the water wash stream to filtration in a charcoal filter, preheating the filtered stream to a temperature suitable for catalytic hydrogenation of the acetylene contained in the stream, and then subjecting the thus preheated stream to conditions of hydrogenation to remove acetylenes therefrom.

It has been known to caustic wash the feed to remove carbonyls and sulfur compounds therefrom before hydrogenating the contained acetylenes in the butadiene stream in a butadiene-acetylene-removal unit employing a catalyst. A water washer downstream of the caustic washers is required to remove any caustic carry-over and reduce to some extent the remaining carbonyl compounds. During the caustic wash operation, polymers are formed due to the catalytic action of the caustic (high strength increases the formation of polymers) on the carbonyls in the butadiene streams. These "aldehyde-resins" or polymers are contained in the feed to the hydrogenation unit, although they are somewhat reduced by the water washer and by a water and caustic layer being separated in the feed accumulator on the butadiene unit. These resins or polymers are produced by chemical reaction and form solid polymers in the feed train of the butadiene and a liquid polymer in the butadiene hydrogenation reactors. The presence of these polymers, an elevated temperature and trace of caustic and, perhaps, iron oxide, cause other compounds including butadiene to react with the resins. This can result in off-test butadiene production and increase cleaning of the butadiene unit heat train as well as catalyst poisoning.

It has now occurred to me that the interposition of a charcoal filter between the caustic treatment zone, in which the butadiene containing stream is treated and then usually water washed, and the heat exchanger zone in which the stream is pe-heated will substantially reduce, if not entirely prevent, the deposition of polymers or polymeric material in said treating zone. This, then, has avoided the problem of fouling, which has necessitated the frequent shutdown and cleaning of the heat exchanger or exchangers, as the case may be. The filter has been found to absorb the material which has resulted in the fouling deposits in the heating zone. It now appears that the filter zone not only removes aldehyde polymers or polymeric material, but also absorbs carbonyls which have caused further polymerization by reaction in the heating zone or train. Thus, an operation which had to be interrupted at least every two months, which required the use of alternate sets of heat exchange equipment, has now been materially and considerably improved in that the alternate set of equipment can be eliminated, if desired. A set of equipment will now operate for six or more months without shutdown for removal of polymeric deposits. Throughput per unit of time has also been increased.

It is known in U.S. Pat. 3,281,489, issued Oct. 25, 1966, Gordon D. Goering, first to selectively hydrogenate the acetylenes in a butadiene stream and to then effect the aldol condensation of carbonyls therein. However, this order of proceeding does not remove, as does the present invention, the aldehydic, polymeric or polymer-forming materials prior to the hydrogenation of the acetylenes. Carbonyls are not reduced. Nor does delaying the caustic treatment to beyond the acetylene hydrogenation remove sulfur compounds before the butadiene stream is contacted with the hydrogenation catalyst. It is essential for optimum operation with the desirable acetylene hydrogenation catalyst to remove the materials with the aid of the charcoal filter of the invention.

The use of a char filter to remove polymers from a cuprous ammonium acetate solution which has been used to absorb alkyl acetylenes from an a priori hydrogenated butadiene stream which has been hydrogenated to remove vinylacetylenes therefrom as set forth in U.S. Pat. 3,091,654, issued May 28, 1963 in which the filter removes any polymer formed in the process in which prior to filtering the acetate solution containing alkyl acetylenes has been subjected to an elevated temperature.

U.S. Pat. 2,635,707, issued Apr. 21, 1953, Forrest E. Gilmore, teaches that activated-charcoal will selectively absorb low boiling normally gaseous hydrocarbons.

It is an object of this invention to provide a process for the removal of acetylene from butadiene streams containing the same. It is another object of this invention to provide a process for removing acetylene from a butadiene stream by hydrogenating the acetylenes therein in which process fouling of heat exchange equipment preceding the acetylenes removal hydrogenation step is substantially completely eliminated. It is a further object of this invention to provide a process in which acetylenes are removed from a butadiene stream containing the same and wherein polymerization or deposition of polymers due to the presence of carbonyls is avoided. It is a still further object of this invention to extend the time during which heat exchangers preheating a butadiene stream containing acetylenes which has been pre-treated with caustic can be used prior to shutdown for inspection and any cleaning. It is a still further object of this invention to increase the throughput per unit time of such an operation.

Other aspects, concepts and objects of this invention are apparent from a study of this disclosure of the drawing and the appended claim.

According to the present invention, there is provided a process for the removal of acetylene from a butadiene stream containig the same which comprises caustic treating said stream, filtering said stream by means of a charcoal or equivalent filter preheating said stream in a heating zone and then subjecting said stream to catalytic hydrogenation to selectively remove acetylenes therein therefrom.

In the preferred form of the process there is a water wash downstream of the caustic wash to remove any caustic carry-over and to reduce to some extent carbonyls remaining.

Referring now to the drawing which schematically illustrates the principle steps of the invention a butadiene stream containing acetylenes is passed by 1 to caustic treating zone 2 in which the feed is caustic washed to remove carbonyls and any sulfur compounds therefrom. The thus treated stream passes by pipe 3 to water wash zone 4 in which it is water washed. The stream then passes by pipe 5 to a filter according to the invention 6. This filter is now preferred to be a charcoal. The charcoal preferably will be a high-capacity charcoal which absorbs as well as filters. There are various kinds of charcoal which can be employed. For example, there are wood charcoal, boneblack, coconut shell charcoal, etc.

From filter unit 6 the now treated feed passes by pipe 7 to heat exchange unit or zone 8 wherein the feed can now be heated without deposition of the ordinarily deposited and fouling materials. The now preheated feed is passed by pipe 9 to the usual acetylene hydrogenation unit in which the stream is catalytically hydrogenated to remove substantially therefrom its acetylene content. The hydrogenation unit forms no part of the invention except as the invention is adapted especially to precede such a unit. The hydrogenation unit is indicated at 10.

The hydrogenation of acetylenes in butadiene streams containing the same is well known. The catalysts which are employed for this hydrogenation are various and are also known. Catalysts which are particularly aided by the operation of this invention are:

Those containing finely divided metals such as active nickel, cobalt, copper, platinum and palladium and mixtures of these or with other metals such as iron, zinc, cadmium, chromium, silver, etc. on inert supports such as alumina, silica, diatomaceous earth, and the like.

Reasonable variation and modification are possible within the scope of the foregoing disclosure, the drawing and the appended claim to the invention the essence of which is that there has been provided an improved process for the purification of butadiene by removal of acetylenes therefrom; more specifically, there has been interposed a charcoal filtering zone intermediate to caustic treatment zone and the preheating zone which precedes the acetylene hydrogenation unit in which acetylenes are removed from the butadiene, thereby preventing fouling and concomitant frequent cleaning of the preheating zone equipment.

I claim:

1. In the purification of a butadiene containing stream, also containing acetylene which is hydrogenated to remove acetylene therefrom and which is caustic treated water washed and then preheated in a preheating zone prior to hydrogenation the improvement which comprises passing the caustic treated stream through a charcoal filter prior to its entry into said preheating zone thereby preventing deposition of polymers in said zone.

References Cited

UNITED STATES PATENTS

| | | | |
|---|---|---|---|
| 2,818,458 | 12/1957 | Harclerode et al. | 260—683.4 |
| 3,091,654 | 5/1963 | Kestner | 260—681.5 |
| 3,281,489 | 10/1966 | Goering | 260—681.5 |
| 3,308,201 | 3/1967 | Bowers et al. | 260—681.5 |
| 3,336,414 | 8/1967 | Woerner | 260—681.5 |

DELBERT E. GANTZ, Primary Examiner

G. E. SCHMITKONS, Assistant Examiner

U.S. Cl. X.R.

208—48, 255, 286, 301